(12) United States Patent
Candelore

(10) Patent No.: US 6,996,238 B2
(45) Date of Patent: Feb. 7, 2006

(54) METHOD FOR GENERATING AND LOOKING-UP TRANSACTION KEYS IN COMMUNICATION NETWORKS

(75) Inventor: Brant Candelore, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 833 days.

(21) Appl. No.: 09/863,932

(22) Filed: May 22, 2001

(65) Prior Publication Data

US 2002/0041337 A1 Apr. 11, 2002

Related U.S. Application Data

(60) Provisional application No. 60/239,317, filed on Oct. 2, 2000.

(51) Int. Cl.
*H04L 9/00* (2006.01)

(52) U.S. Cl. .................. 380/278; 380/277; 380/279

(58) Field of Classification Search ........ 380/277–286, 380/264; 713/153, 162
See application file for complete search history.

(56) References Cited

U.S. PATENT DOCUMENTS

| 4,605,820 A | * | 8/1986 | Campbell, Jr. ............... 705/71 |
| 6,026,165 A | * | 2/2000 | Marino et al. .............. 380/273 |
| 6,782,474 B1 | * | 8/2004 | Ylonen ........................ 713/162 |

* cited by examiner

*Primary Examiner*—Gilberto Barron, Jr.
*Assistant Examiner*—Lan Dai Truong
(74) *Attorney, Agent, or Firm*—Blakely, Sokoloff, Taylor & Zafman, LLP

(57) ABSTRACT

Method and apparatus for generating keys for encoding data for transmission, a device identification is accessed and at least one key corresponding to the device identification. Data is encoded using at least one key. A message is transmitted from the first device to the second device, the message comprising a header comprising the device identification and a datafield comprising the encoded data. The second device uses the device identification received in the header of the message to determine the at least one key and decode the encoded data received in the datafield of the message using the determined at least one key.

21 Claims, 6 Drawing Sheets

METHOD FOR GENERATING AND LOOKING-UP TRANSACTION KEYS IN COMMUNICATION NETWORKS

This application claims the benefit of U.S. Provisional Application No. 60/239,317 filed Oct. 2, 2000.

FIELD OF THE INVENTION

Background

Cable Set Top Boxes (STBs) may have two-way interactivity with the headend in a cable network. However, security problems such as privacy and denial of service exist. Some of the data may be snooped by someone observing the shared wire that is connected among homes in a neighborhood, for example. For this reason, cable modems have built-in message encryption hardware (such as Data Encryption Standard (DES) hardware) and scrambling/descrambling capability. The Digital Audio/Visual Council (DAVIC) Out-of-Band (OOB) uses a different signaling method than cable modems, and does not have its built-in DES scrambling/descrambling capability. STBs are being designed with both cable modem and DAVIC OOB capability, and some with just DAVIC OOB capability. This presents possible security problems. For example, in a denial of service attack, someone might attempt to replay messages sent from a neighbor's STB to the headend. An attacker might replay a VOD (video on demand) "restart" command to harass a customer watching VOD. Such an attack would cause the movie to start over and over. It is therefore desirable to perform a function to provide a privacy function for the DAVIC OOB.

DESCRIPTION OF THE INVENTION

A method and apparatus for generating keys to encrypt communication in a network using distinctive device identification. In an IP network, the invention makes use of the unique Media Access Control (MAC) address header information as the distinctive device identification.

BRIEF DESCRIPTION OF THE DRAWINGS

The object features and advantages of the present invention will be apparent to one skilled in the art from the following Detailed Description in which.

DETAILED DESCRIPTION

In the following description for purposes of explanation numerous details are set forth in order to provide a thorough understanding of the present invention. However, it will be apparent to one skilled in the art that these specific details are not required in order to practice the present invention. In other instances, well-known electrical structures and circuits are shown in block diagram form, in order not to obscure the present invention unnecessarily.

The present invention provides a method and apparatus for generating a secure key which may be used to encode and decode data communicated across a network, such as a cable network.

Figure 1:
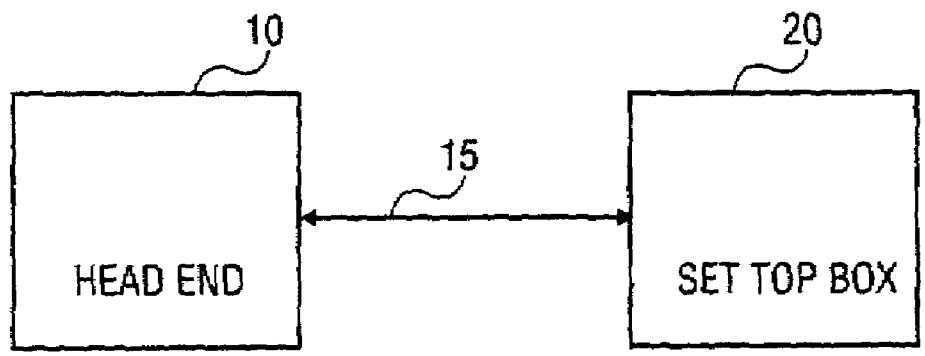
FIG. 1 is a simplified block diagram of one embodiment of the present invention.

One embodiment is simply illustrated by FIG. 1. The service provider 10 communicates across a communication network 15 to the user's device 20. In one embodiment, the service provider 10 is a cable network. In another embodiment, the service provider may be, for example, a terrestrial broadcaster, a direct broadcast satellite company, phone or Digital Subscriber Line (DSL) service provider or other source. The user's equipment 20 operates to process the received data and to provide access to the user. The data may include program content, system information, entitlement management messages, entitlement control messages, VOD signaling, Web pages, Email, and other data. In one embodiment, the user device 20 is a set top box (STB), which couples to a monitor or broadcast display device for providing audio/visual programming. This device may be separate or included within a broadcast device.

Figure 2:
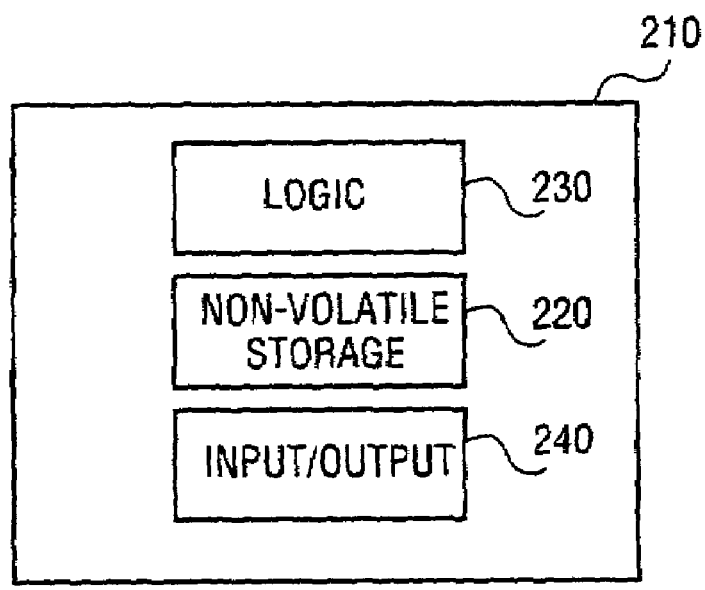
FIG. 2 is a simplified block diagram of the encoding and decoding function of the present invention.

FIG. 2 is a simplified block diagram of one embodiment of an apparatus that operates in accordance with the teachings of the present invention. This apparatus would be included or connected to the headend 10 and set top box 20 such that data could be encoded at one device (e.g., 10) sent in encoded form across the network 15 to the second device 20 and decoded at the second device.

The apparatus 210 includes non-volatile storage 220, logic 230 and input-output 240. In one embodiment, the non-volatile storage medium 220 stores distinctive information for at least one key, corresponding to a device. In one embodiment, the distinctive information is an identification of the device. In one embodiment in which a device, such as a set top box, communicates with the headend of a cable service provider, the non-volatile storage medium located in the set top box stores the key that is generated from the device identification of the set top box. In one embodiment, this device identification is the MAC address. This provides a unique identifier, which ensures a unique key using the same algorithm to generate the key.

In one embodiment in which communications are performed on the Digital Audio/Visual Council (DAVIC) out-of-band (OOB) connection, a MAC address is delivered as part of the header source device address information of an IP (internet protocol) message.

In one embodiment, the logic 230 encodes data using the key and decodes encoded data using the key, wherein the key is determined or accessed in accordance to a corresponding device identification. In one embodiment, the logic may access a data base of device identifications and corresponding keys. This is useful, for example, in a device such as a cable system headend, which communicates with multiple devices such as set top boxes. The keys can be loaded into each user device, e.g. set-top box at factory configuration time, using a secret key generation algorithm known only to the factory loader and network controlling entity. At the network controlling entity, the logic 230 determines the keys using the device identification and generation keys stored in the nonvolatile memory 220. The secret key generation algorithm uses the distinct device identification and the generation keys in FIG. 3. Later, the network controlling entity 10 does not have to store the keys only the algorithm. The algorithm is used to rederive the device keys based on the distinct device indentification received in a message.

All sensitive messages sent and received by the device can be sent encrypted using these keys.

Figure 3:
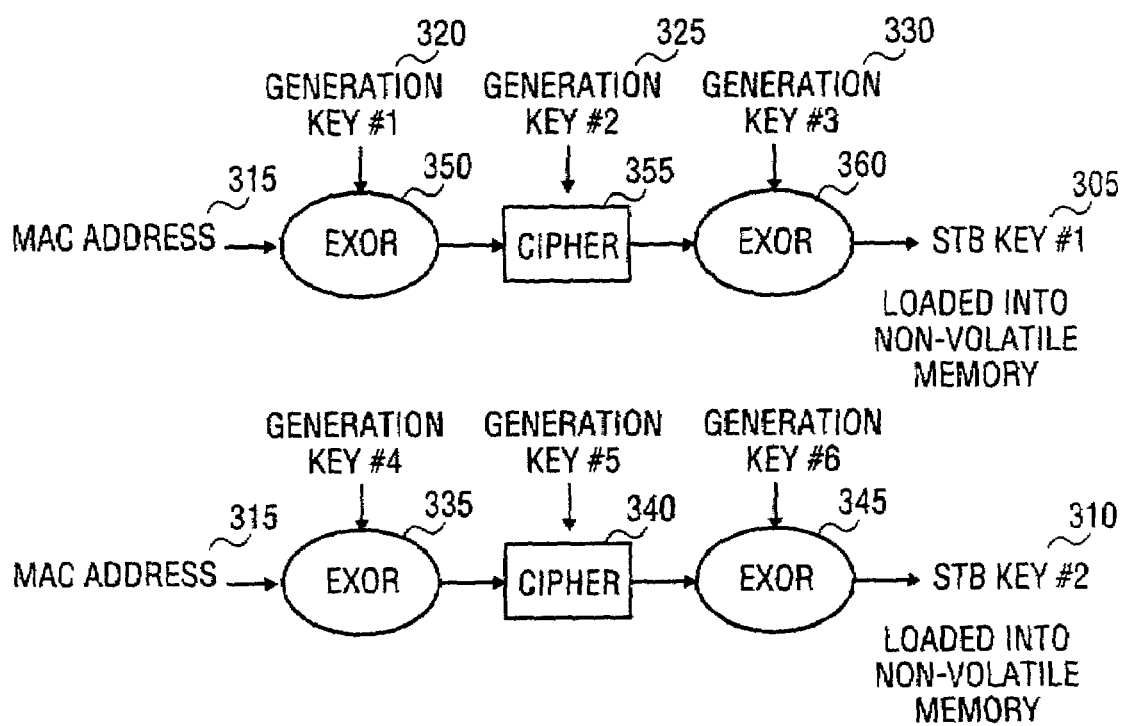
FIG. 3 is a simplified block diagram illustrating one embodiment for the generation of keys used to encode data.

One embodiment is illustrated in FIG. 3. Although FIG. 3 illustrates one process and structure for generation of keys, other processes and structures may be used. The keys generated 305 and 310 may be used for hashing and signing a message or encrypting a message. The keys may be re-generated each time a particular device, e.g. STB, needs to be accessed by the network controlling entity, e.g. the cable headend. In the case the keys are used to hash and sign a message, it should be noted that it may be possible to only send part of the hash and still be secure in order to reduce the message payload. As already mentioned, the headend does not need to store a database of keys. The algorithm and generation keys can be used to rederive the keys using the particular device identifications. Furthermore, the logic illustrated, i.e. cipher functions and Exclusive OR functions are illustrative and not intended to limit the possible functions that may be implemented. Furthermore, the multistage process illustrated in FIG. 3 is an example of one embodiment. Fewer or more stages may be implemented to generate the key or keys utilized to encode data for secure communications.

The MAC address 315 of a set-top box can be used a unique identifier. This unique identifier can be used as a seed for key generation or as the host identifier. The key generation process can use a number of different generation keys. According to one embodiment of the invention, as shown in FIG. 3, six (6) generation keys are utilized as represented by Generation Key #1–#6. It is expected that Generation Keys #1–#6 would all be unique values and would be kept secret from the user of the set-top box. For this embodiment, Generation Key #1 320, Generation Key #2 325, and Generation Key #3 330 are used to create a STB Key #1 305. Similarly Generation Key #4, Generation Key #5, and Generation Key #6 are used to create a STB Key #2 310. The use of Exclusive ORs (EXORs 350, 360, 335 and 345) is one technique to permute data. The use of simple EXORs still requires a hacker to search for the values of the entire key space for Generation Key #1 320, Generation Key #2 325 and Generation Key #3 330 at the same time. Using a key generation process as shown in FIG. 3, an operator would not need to keep a database of STB Key #1 305 and STB Key #2 310 values for each set-top box. Rater, these key values can be re-generated on-the-fly upon receipt of the MAC address 315 during communications.

Figure 4:
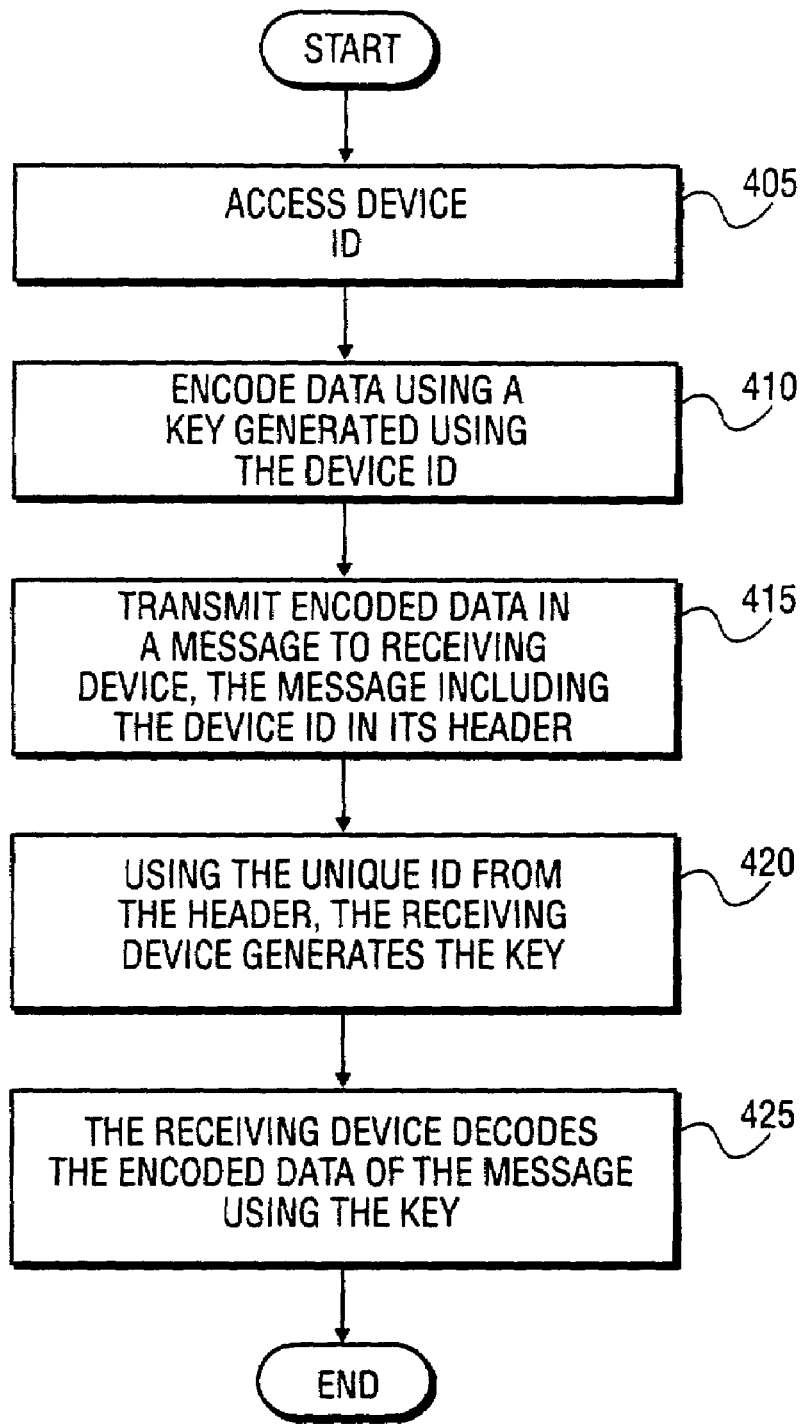
FIG. 4 is a flow chart illustrating one embodiment of the process of the present invention.

FIG. 4 illustrates one embodiment of the method of the present invention. At block 405, the device identification is accessed. As noted earlier, the device identification may be a distinctive device identification, such as the MAC address delivered as part of the header source address information of an IP message. At block 410, data is encoded using a key generated using the device ID. At block 415, the encoded data is transmitted in a message to a receiving device, the message including the device ID, for example, in it's header. Using the device ID from the header, the receiving device accesses the key, block 420. As noted earlier, the receiving device may generate die key using the device ID, or may access, for example, from non-volatile memory, the key corresponding to the device ID. At block 425 the receiving device decodes the encoded data of the message using the key.

Figure 5:
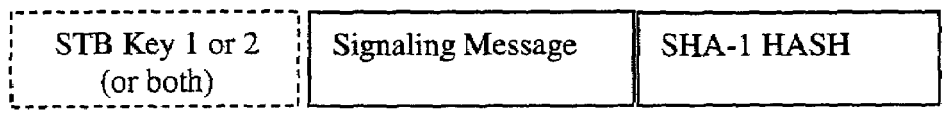
FIG. 5 is an illustration of a signaling message utilized in accordance with an embodiment of the present invention.

Using the key or keys generated, a signaling message and Secure Hash Algorithm—version 1 (SHA-1) can be generated as illustrated in FIG. 5. In this case, the STB Key may be hashed with the message, but not sent. At the receiving end, the same process is repeated to confirm the hash.

Figure 6:
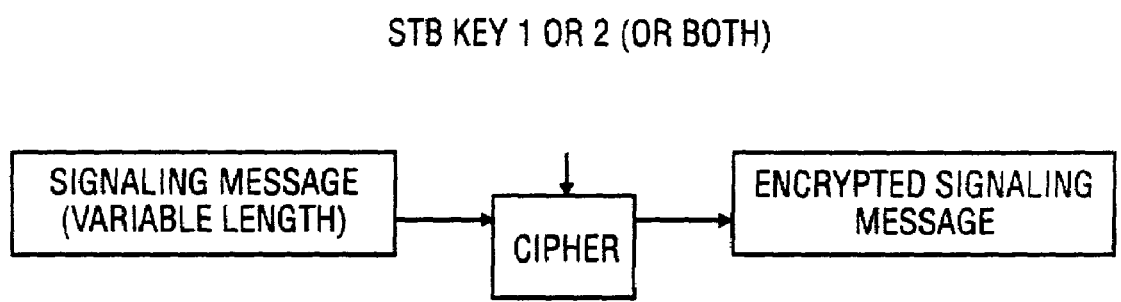
FIG. 6 illustrates an encrypted signaling message using a key generated in accordance with an embodiment of the present invention.
Figure 7:
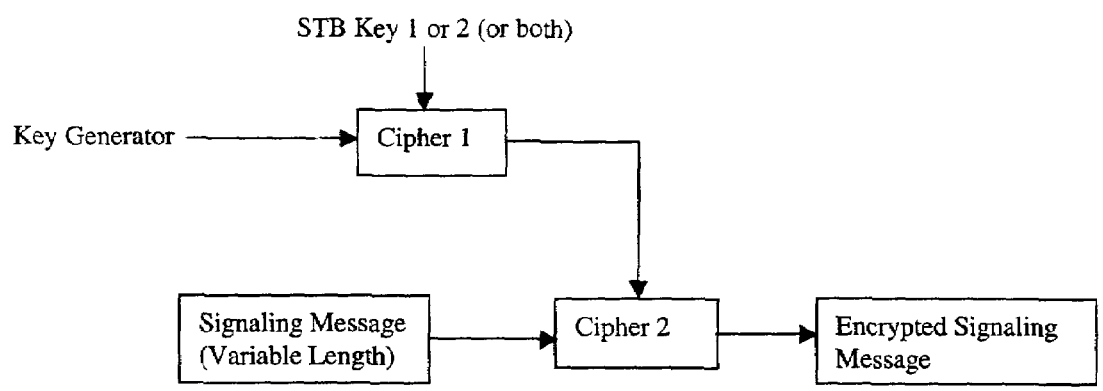
FIG. 7 is a simplified block diagram of one embodiment for encrypting data.

The keys, as illustrated in FIG. 6 may also be used to encode data in a message. It is also possible to add any number of additional stages to make it more difficult for a hacker to trial for the values STB 1 or 2 (or both). In FIG. 7, an additional stage is added. Preferably the Key Generator value can be a random number. It may be chosen by either the network controlling entity or the set-top box. This value can be sent ahead of time, in the clear along with the message, or a value that is preloaded into the set-top box at factory creation time.

The invention has been described in conjunction with different embodiments. It is evident that numerous alternatives, modifications, variations and uses will be apparent to those skilled in the art in light of the forgoing description.

What is claimed is:

1. A method comprising:
   accessing in a first device a device identification and at least one key corresponding to the device identification, the at least one key is generated using both the device identification and a plurality of generation keys;
   encoding data using the at least one key;
   transmitting a message from the first device to the second device, the message comprising a header comprising the device identification and a data field comprising the encoded data; and
   using the device identification received in the header of the message by said second device to determine the at least one key and decode the encoded data received in the data field of the message using the determined at least one key.

2. The method as set forth in claim 1, wherein the device identification is selected from the group consisting of a unique device identification of the first device, a unique device identification of the second device, a device address of the first device, and a device address of the second device.

3. The method as set forth in claim 1, further comprising generating the at least one key using a multistage process wherein a different generation key of the plurality of generation keys is used at each stage to operate with the output of a prior stage, a first stage having as input the device identification, and a last stage outputting a key of the at least one key.

4. The method as set forth in claim 3, wherein a first stage of the multistage process is an Exclusive OR function, a second stage of the multistage process is a cipher function, and a third stage of the multistage process is an Exclusive OR function.

5. The method as set forth in claim 1, wherein the at least one key for encoding is selected from the group consisting of hashing and signing a message and encrypting a message.

6. The meted as set forth in claim 1, wherein the device identification is a Media Access Control (MAC) address.

7. A device comprising:
   a non-volatile storage medium for storing information for at least one key corresponding to a device identification of a communication device, the information comprises generation keys, the generation keys concurrently used with the device identification to generate the at least one key;
   a first logic to encode data using the at least one key and decode encoded data using the at least one key; and
   an input/output to communicate encoded data in a message, the message including the device identification and the encoded data.

8. The device as set forth in claim 7, wherein a first communication device communicates with a second communication device and the device identification corresponds to the first communication device.

9. The device as set forth in claim 7, wherein the information comprises the at least one key and corresponding device identification.

10. The device as set forth in claim 7, wherein the device is selected from the group consisting of a device to connect to a cable network, a direct broadcast satellite (DBS) device, a phone device, an internet device, a broadcast device and a set top box.

11. The device as set forth in claim 7, wherein the device comprises a service provider that communicates data with a second device, the device identification corresponding to the second device.

12. The device as set forth in claim 11, wherein the device is one of a cable provider headend, a DBS uplink, a digital subscriber line (DSL) center, or website and the second device is a set top box.

13. The device as set forth in claim 7, wherein the non-volatile storage medium is selected from the group consisting of FLASH memory, static random access memory (SRAM), hard disk media, memory stick, battery-backed RAM, fuses, nonvolatile removeable media and optical media.

14. The device as set forth in claim 7, further comprising a second logic, the second logic using the generation keys and the device identification to generate the at least one key.

15. The device as set forth in claim 14, wherein the second logic comprises:
 a first sub-logic having as input the device identification and a first generation key of the generation keys, said first sub-logic generating a first output;
 a second sub-logic having as input the first output and a second generation key of the generation keys, said second sub-logic generating a second output; and
 a third sub-logic having as input the second output and a third generation key of the plurality of generation keys, said third sub-logic generation the at least one key as an output.

16. The device as set forth in claim 15, wherein the first sub-logic, second sub-logic and third sub-logic are functions selected from the group consisting of logic functions, combinatorial functions and cipher functions.

17. The device as set forth in claim 7, wherein the message is selected from the group consisting of hashing and signing a message and encryption.

18. A system comprising:
 a first device comprising
  a non-volatile storage medium for storing information for at least one key corresponding to a device identification of first device, the information comprises generation keys, the generation keys used with the device identification to generate the at least one key,
  a first logic to encode data using the at least one key and decode encoded data using the at least one key, and
  an input/output to communicate encoded data in a message, the message including the device identification of the first device and the encoded data;
 a communication medium; and
 a second device coupled to the first device through the communication medium, the second device comprising
  a non-volatile storage medium for storing information for at least one key corresponding to a device identification of the first device,
  a second logic to encode data using the at least one key and decode encoded data using the at least one key, and
  an input/output to communicate encoded data in a message, the message including the device identification of the first device and the encoded data.

19. The system as set forth in claim 18, wherein the second device communicates with a plurality of first devices, the non-volatile storage medium of the second device storing information for at least one key for each first device.

20. The system as set forth in claim 18, wherein the information comprises the at least one key and corresponding device identification.

21. The device as set forth in claim 18, further comprising a second logic, the second logic using the generation keys and the device identification to generate the at least one key.

* * * * *